C. ZANG.
NET MAKING MACHINE.
APPLICATION FILED MAR. 29, 1906.
948,386.
Patented Feb. 8, 1910.
5 SHEETS—SHEET 1.
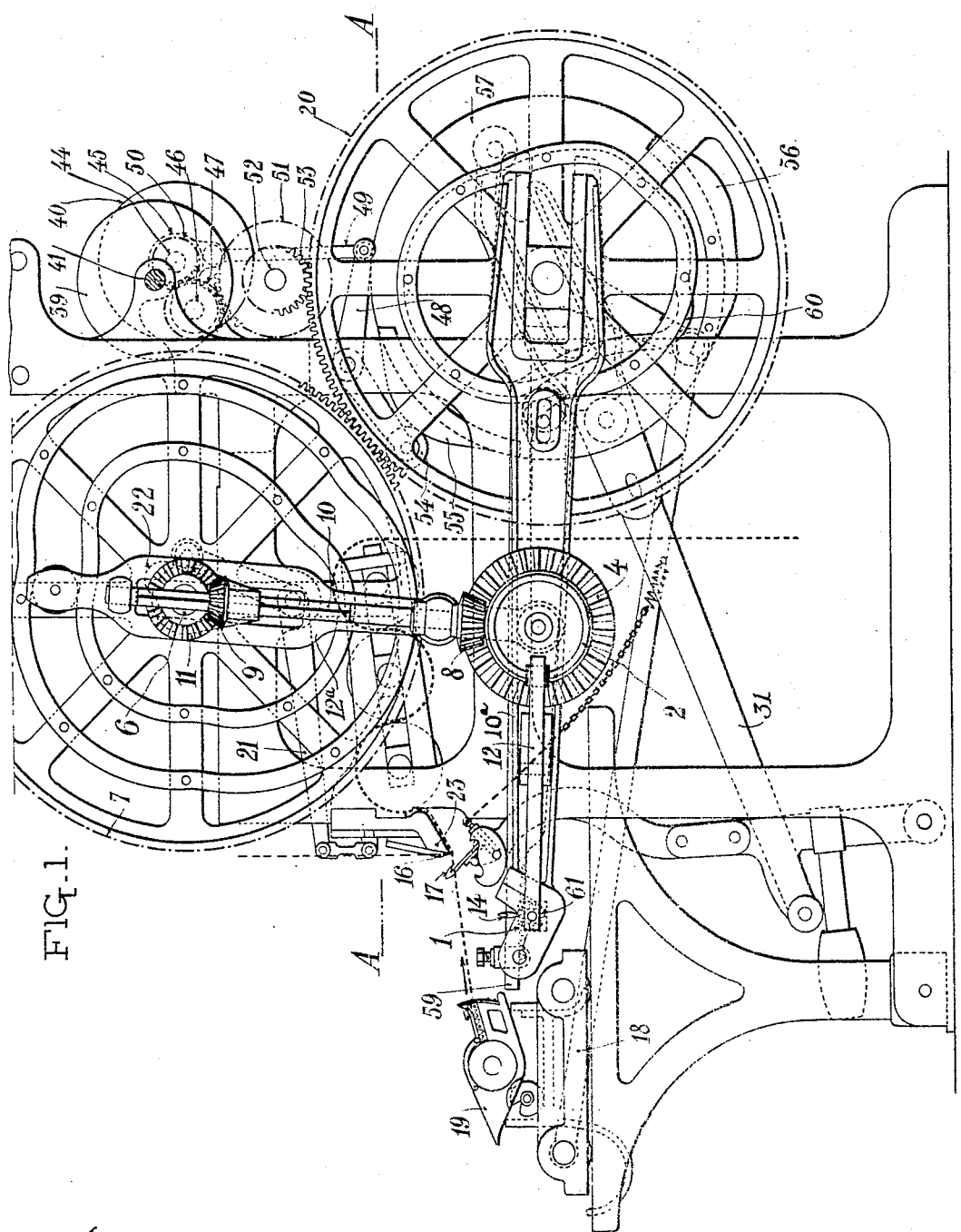

C. ZANG.
NET MAKING MACHINE.
APPLICATION FILED MAR. 29, 1906.
948,386.
Patented Feb. 8, 1910.
5 SHEETS—SHEET 2.
FIG. 1.ª
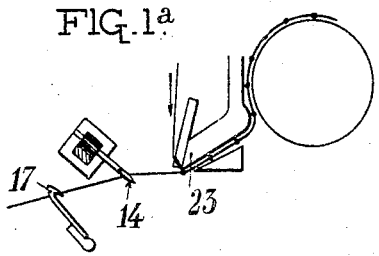
FIG. 8.ª 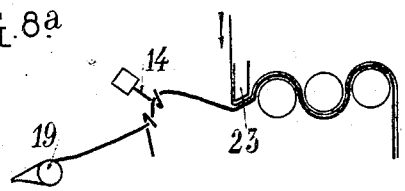 FIG. 9.ª
FIG. 8.ᵇ 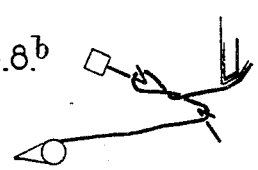 FIG. 9.ᵇ 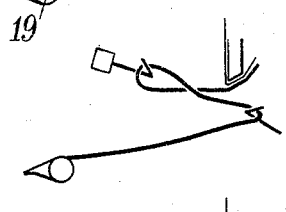
FIG. 8.ᶜ 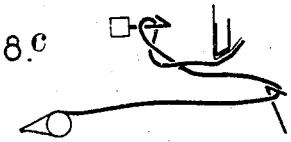 FIG. 9.ᶜ 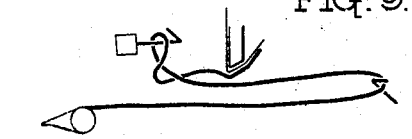
FIG. 8.ᵈ 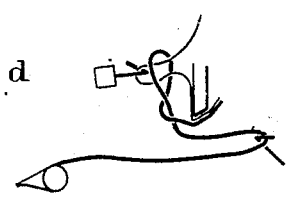 FIG. 9.ᵈ 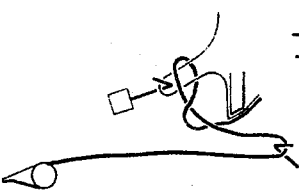
FIG. 8.ᵉ 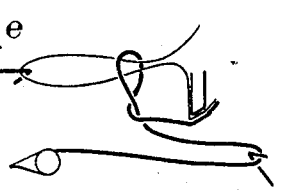 FIG. 9.ᵉ 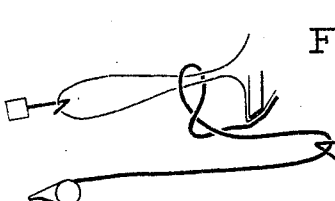
FIG. 8.ᶠ 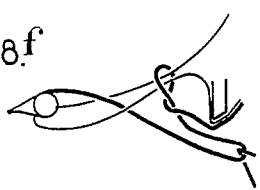 FIG. 9.ᶠ 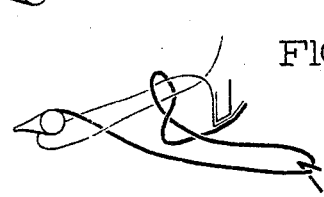
FIG. 10. 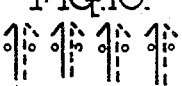 FIG. 11.
Witnesses
D. B. Shallenberger
C. M. Boulter
Inventor
Charles Zang
By Wm. E. Boulter
Attorney C. ZANG.
NET MAKING MACHINE.
APPLICATION FILED MAR. 29, 1906.
948,386.
Patented Feb. 8, 1910.
5 SHEETS—SHEET 3.
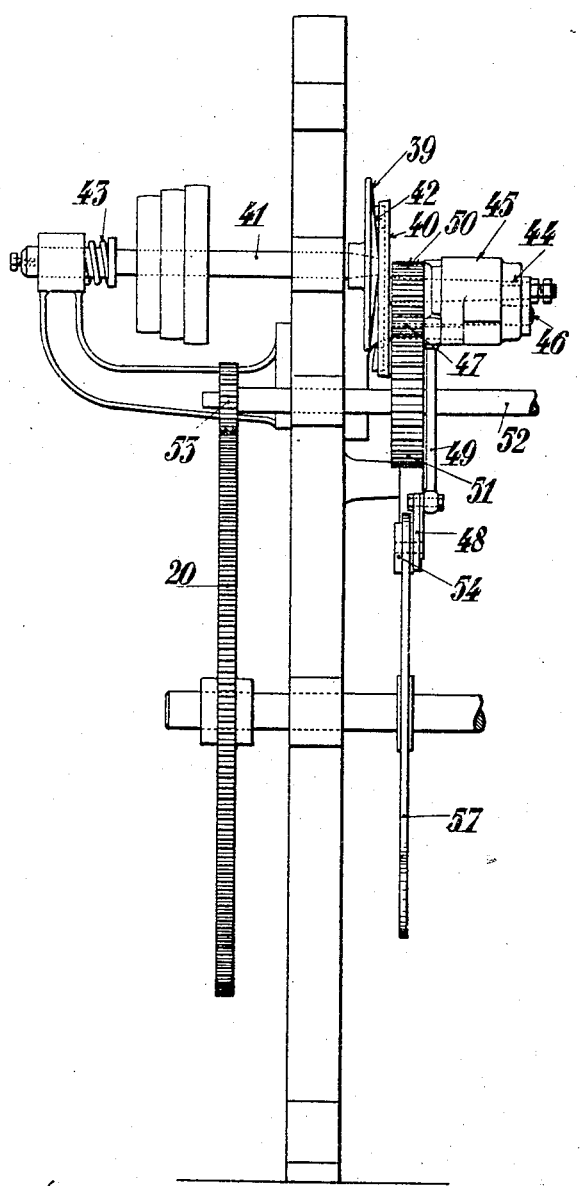
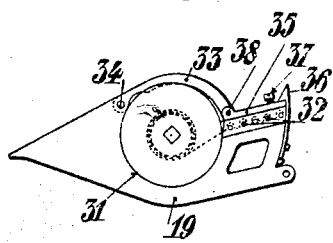

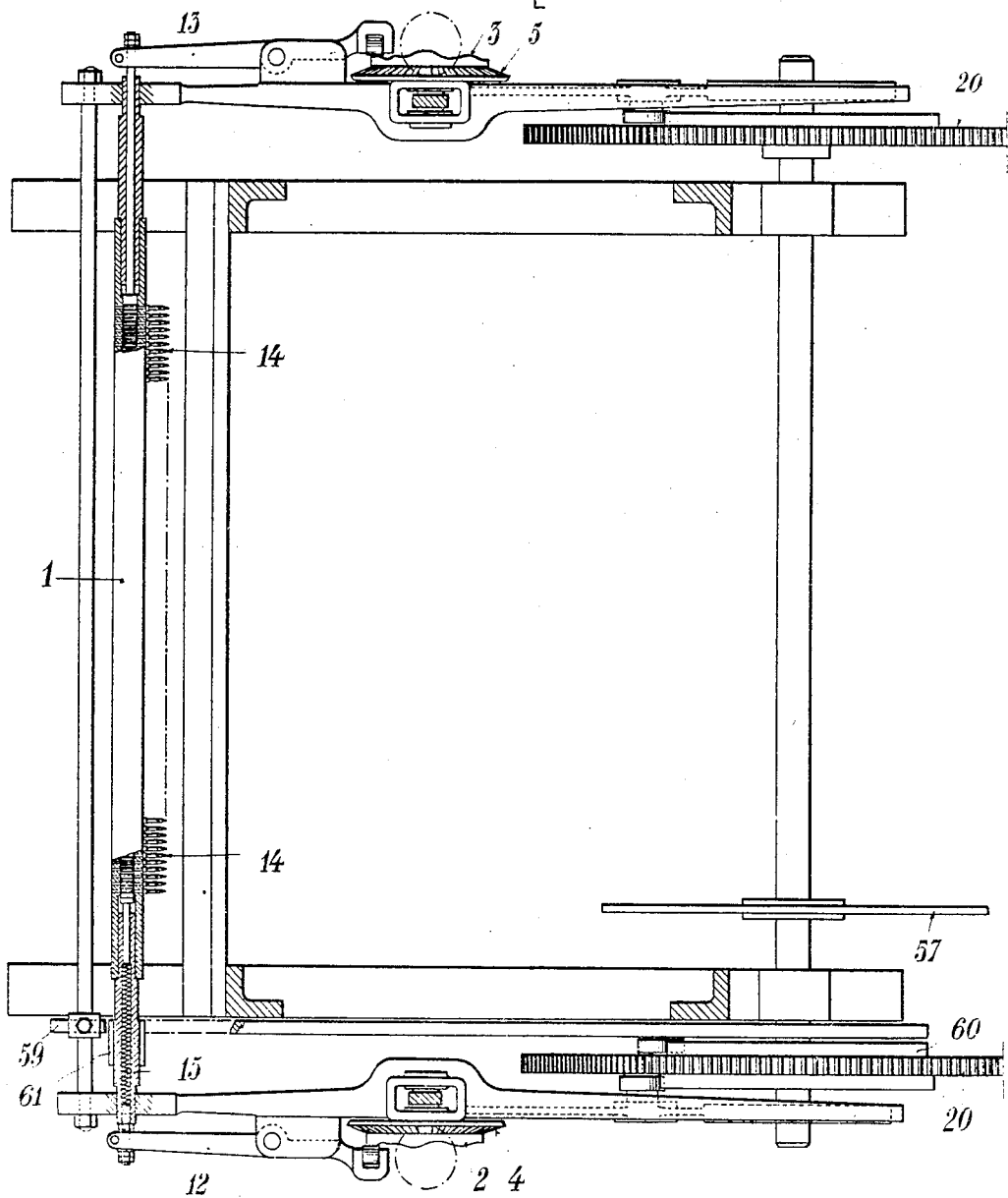

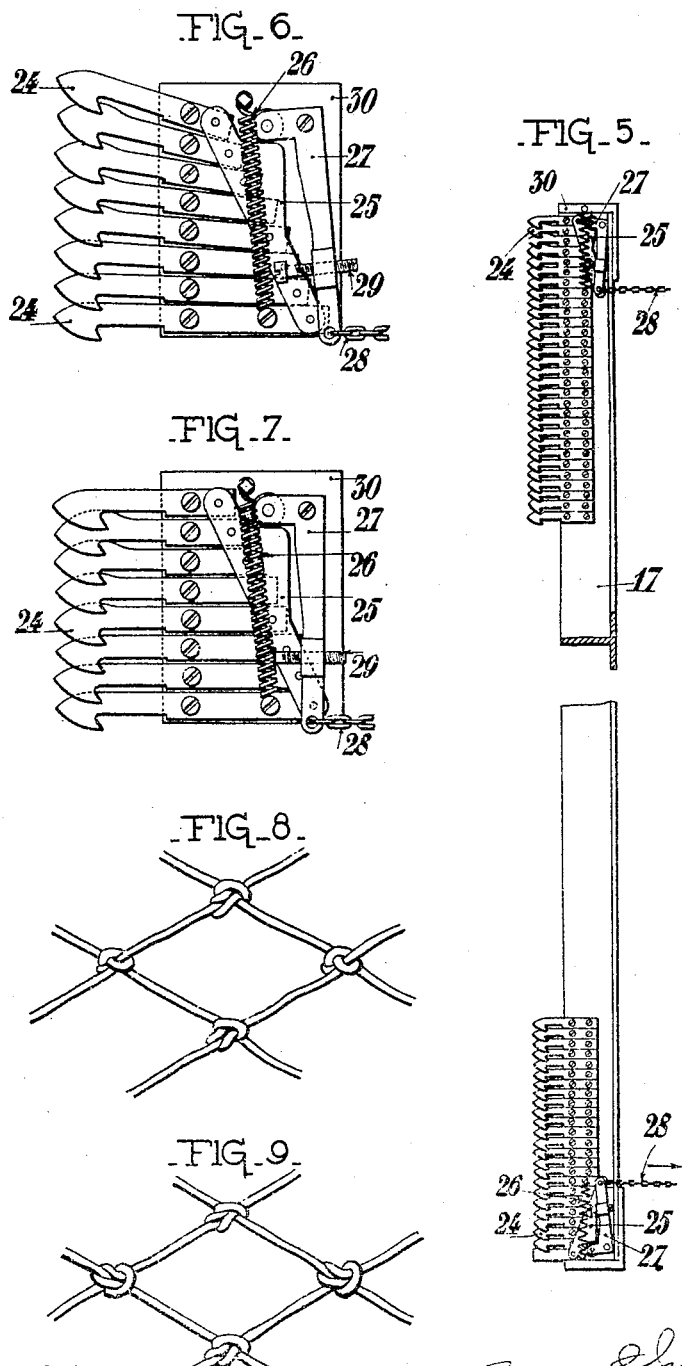

UNITED STATES PATENT OFFICE.

CHARLES ZANG, OF PARIS, FRANCE.

NET-MAKING MACHINE.

948,386.  Specification of Letters Patent.  Patented Feb. 8, 1910.

Application filed March 29, 1906. Serial No. 308,801.

*To all whom it may concern:*

Be it known that I, CHARLES ZANG, a citizen of the Republic of France, residing at Paris, in France, have invented certain new and useful Improvements in Net-Making Machines, of which the following is a specification.

This invention relates to improvements in machines of the Jouannin type, and more especially to machines such as form the subject-matter of the United States Patent No. 43888. In these machines two series of threads are used for making knots: threads passing from spools arranged at the back of the machine, and an equal number of threads contained in shuttles arranged in a carriage which moves in front. The knotting of the threads of the first series with those of the second, is done by means of a bar called the hook bar, which has as many small hooks as there are threads in each series. The bar is movable in every direction, and the hooks rotate about their axes under the action of a toothed rack engaging with the teeth of pinions formed in one piece with each hook. The hooks first seize the threads of the shuttles, then introduce into the loops thus formed, the respective threads of the spools, which they subsequently deposit on the point of the shuttles. The knots are completed on the edge of the jaw through which the spool threads pass. A comb or reed provided with rods or notches serves to guide the threads of the spools, while a flying comb provided with teeth insures the tension of the shuttle threads.

One construction of net-making machine according to this invention is illustrated in detail, in the accompanying drawings, in which:—

Figure 1 is a side elevation of the whole machine. Fig. 2 a partial back elevation, Fig. 3 shows on a larger scale one of the shuttles of the said machine. Fig. 4 is a sectional plan on the line A—A of Fig. 1. Fig. 5 shows the improved flying comb of the said machine. Figs. 6 and 7 show in two different positions and on an enlarged scale, the extreme or end hooks of the flying comb. Fig. 8 is a view of a portion of a net as made by an ordinary Jouannin machine, Figs. 1$^a$ 8$^a$ to 8$^f$ illustrate diagrammatically the stages by which such net is formed. Fig. 9 illustrates a similar portion of net as made by a machine embodying the present invention, and Figs. 9$^a$ to 9$^f$ illustrate diagrammatically a similar series of stages to those shown in Figs. 8$^a$ to 8$^b$ for making the net shown in Fig. 9. Figs. 10 and 11 show diagrammatically two different positions which may be occupied by the thread-taking hooks in forming different knots.

In the machines set forth in the United States patent hereinbefore referred to the transverse movement of the hook bar is effected by means of plates projecting on two brackets secured to the sides of the machine frame at a suitable distance from the ends of the bar; at each passage of the bar, these projections push it back in one or in the other direction, according to the requirements of the taking of the thread by the hooks. On the other hand, the rotation of the said hooks is produced by means of a lever acting on the toothed rack mentioned before, which is operated by a cam secured to the spindle of the large wheel of the machine. It follows therefrom, that, at each revolution, the movement of the bar, and the rotation of the hooks take place in an identical manner, and in the net thus obtained, the knots are alternately turned as shown in Fig. 8, and cannot be obtained in a different way. In other words, the hooks of the box are always turned toward the right when they seize the weft or threads of the shuttles, and toward the left when they engage the warp or spool threads. Each hook takes at each revolution the same thread of the shuttles, but not the same thread of the spools. The comb of the jaw through which pass the spool threads, having a reciprocating longitudinal movement, under the action of a two-positioned cam which makes half a revolution to each revolution of the machine, it is either the right hand or the left hand thread that is engaging with the corresponding hook. According to this invention, these conditions are changed by imparting to the parts contributing to the formation of the knots, a movement of their own in a given relation to that of the machine, so as to obtain knots of various shapes, or arranged in various manners, more particularly as shown in Fig. 9.

According to the mechanism shown in Figs. 1 and 4, it is the bar or box 1, with hooks, which has for its function to regulate the different stages of the seizing of the threads, the said bar having two movements, one of rotation about itself, and the other of transverse movement, while the hooks 14 carried by the said bar, have a movement of rotation about themselves. The ends of the bar 1 are supported by the ordinary oscillating levers of the machine, so as to be able to slide laterally relatively to the said levers, under the action of another lever 12 pivoted to the corresponding oscillating lever, which lever 12 receives movement from a cam 2 secured to a bevel wheel 4 driven by the upper spindle 6 (or by the wheel 7) by means of the spindle 10 and bevel pinions 8, 9. The spindle 10 for each oscillating lever $10^a$ rotates in two bearings secured to the vertical connecting rod $12^a$ controlling the oscillating movement of the said lever. The said spindle 10 can slide in the pinion 9 while rotating with the same. The pinion 9 itself is supported in a bearing depending from a collar of the spindle 6, in such manner that the said pinion 9 always remains in mesh with the pinion 11, whatever be the position of the connecting rod and of the corresponding oscillating lever. The rotary movement of the bar 1 about itself is produced by a pinion 61 operated by a toothed rack 59 on a lever controlled by a cam 60 fixed on the wheel 20, as in the aforesaid Jouannin machines set forth in U. S. Patent 43888. At its end opposite the lever 12, the bar 1 has longitudinally passing through it the tail of the tooth rack which controls the rotation of the hooks 14, the said tooth rack being caused to move longitudinally, independently of the movement of the box, by means of another lever 13, and a cam 3 secured to a bevel wheel 5 receiving its movement, by means similar to the wheel 4, from the spindle 6 by the vertical spindle 10, and bevel wheels 8 9. A spring 15 arranged in the interior of one of the ends of the bar 1, between the latter and the corresponding end of the tooth rack, acts simultaneously on the bar and on the tooth rack and has the tendency to bring them into their initial position and to insure contact of the levers 12 13 with the cams 2 3. In the example illustrated, in which the cams 2 3 make only half a revolution for each complete revolution of the machine, the hooks 14 are driven in a certain direction during the first revolution, and in the opposite direction during the next revolution. These different actions take place in the following manner. 1. For the first series of knots, that is to say, during the first revolution of the machine, the hooks 14 of the bar 1 take the threads of the shuttles at their right hand side (Fig. $8^a$) then rotate through three quarters of a revolution from left to right (Fig. $8^b$) in order to form the threads into loops and come opposite the corresponding threads coming from the spools (Fig. $8^c$). Then they rotate from right to left through a quarter of a revolution, and seize the said threads (Fig. $8^d$). Then they continue to rotate from right to left and deposit the threads of the spools on the points of the shuttles (Figs. $8^e$ and $8^f$) which, owing to the movement of the carriage, pass into the loops formed by the threads of the spools. 2. For the second series of knots, that is to say during the second revolution of the machine, the hooks 14 of the bar 1 take the threads of the shuttles at their left (Fig. $9^a$) rotate them through three-quarters of a revolution from right to left (Fig. $9^b$) and come opposite the threads of the spools adjoining those which were seized during the first revolution (Fig. $9^c$). Then they turn from left to right through a quarter of a revolution, in order to seize the said threads (Fig. $9^d$) which are deposited, as before, on the points of the shuttles (Figs. $9^e$ and $9^f$). These successive and different stages could be effected, as far as the rotation of the hooks 14 and of the box 1 carrying them is concerned, in various other manners, that is to say, so as to take the threads of the shuttles or of the spools in other positions than those previously described. Thus the hooks 14, if the cams had certain shapes, could seize the threads which are at their left hand side during the first revolution of the machine, and after having moved laterally to a very small extent $x$, and made half a revolution, seize the right hand threads (Fig. 10) during the second revolution; or they could seize the threads at their right hand side and, after a sufficient lateral movement $y$ and half a revolution, seize the left hand threads (Fig. 11). The knots would thus be turned in a different manner, or in the same direction, according to the shape of the cams producing the movement of the box with hooks or the rotation of the latter. By changing the proportion between the wheels, the same stages could be reproduced every 3, 4, 5, etc. revolutions.

The flying comb 17, the movement of which is produced by the connecting rod 31, has for its object to maintain and to guide the threads coming from the shuttles 19 during the formation of the loops by the hooks 14 and to maintain the said threads slightly stretched, while the carriage 18 is returning, and then to allow them to be tied under the comb 16 of the jaw 23 with the warp threads.

The comb 16, the so-called jaw comb, is in ordinary machines arranged at a fixed level. As has been stated before, it serves to guide the vertical threads between rods or equidistant grooves, but its reciprocating transverse movement is required for alternately causing the threads to be engaged by the hooks. Owing to the above described mechanism, it is possible to do away with the transverse movement of the comb 16, as the bar 1 which carries the hooks 14, itself moves. The same mechanism also renders it possible to give the said comb 16 a movement in the vertical direction by means of bell-crank levers 21, and corresponding cams 22 and to bring it to the lower edge of the jaw 23 at the moment when the knots are being completed the comb sliding on the jaw which is fixed and constitutes one of the longitudinal bars of the frame of the machine. The vertical threads are thus held exactly at their respective distances at the critical moment of the work, which gives a greater regularity to the meshes of the net and insures engagement of the weft with the flying comb for each new row. The engagement of the threads presents certain difficulties at the selvages when nets with small meshes are made. The net being carried away by rolls as it is formed, in the diagonal direction of the meshes constituting the web, it tends to tighten toward the selvages. But the hooks and the teeth of the comb 16 which seize the threads at the different stages of the formation of knots, being arranged at a fixed distance, the result is frequent misses at the said selvages. These drawbacks are avoided by applying at each end of the comb 17 a system of movable teeth 24 (Figs. 5, 6 and 7) arranged in such manner that their movement at the point should be progressive. To that end, the teeth 24 are connected by a small rod 25 at a gradually greater distance from their center of oscillation. A helical spring 26 holds them tightened together at the moment when the knots are being completed at the jaw 23, and when consequently the meshes of the selvages are closed to the greatest extent, while a small bell crank lever 27 resting against a boss of the rod 25, and drawn by a chain 28, moves them apart to the desired extent regulated by the pressure screw 29, at the moment of the engagement of the threads by the hooks 14, the threads maintained between the teeth being also moved apart. Each series of movable teeth 24 is hinged to a plate 30 which can be secured as desired at any point of the comb 17 corresponding to the width of the net that it is desired to produce. It is possible, moreover, to regulate in an exact manner the distance of the said teeth by means of set screws 29, for each size of mesh, which is of great importance.

It is not less important, both for the regularity of the meshes and for insuring the engagement of the threads, that the tension of the threads of the shuttles should be in proportion to that of the spool threads. The tension of the latter can be regulated by means of movable bars arranged at the back of the machine, but the tension of the threads of the shuttles can be obtained only in an imperfect manner by winding the threads about a hook terminating the shuttle. The arrangement shown in Figs. 1 and 3 obviates that drawback. The thread of the circular spool 31' contained in the shuttle 19, passes into a groove between a series of small pins 32 and a movable part 33 hinged at 34. To that part 33 is hinged a bar 35 held in contact with the pins 32 by means of a spring 36. This bar 35 is provided with a screw 37 which enables the pressure of the movable part 33 to be regulated. The latter is cut at its bottom portion to resemble a toothed rack, the teeth or projections of which pass between the pins 32 and press against the thread. The undulation thus produced, produces a resistance to the advance of the thread, that is to say a tension which will be the greater, the more pronounced is the said undulation. This tension will, therefore, depend on the adjustment of the movable part 33.

The various arrangements described, require that the speed of the machine should decrease at certain points at each revolution, namely at the moment of the engagement of the threads of the shuttles and at the moment of the completion of the knots. This reduction of speed cannot be obtained in a satisfactory manner by the use of a mechanism such as oval toothed wheels etc., ordinarily used for obtaining an alternate movement with quick return, the periods at which the said slackening has to take place, not being similar, or symmetrically placed. The mechanism hereinafter described enables the best efficiency and the best results to be obtained. It is constituted by two disks 39 40 (Figs. 1 and 2). The disk 39 is secured to the driving shaft 41, its outer face is conical and when it is thrown into gear, it rests against the corresponding face of the disk 40 provided with a leather ring 42, the contact of which with the disk 39, under the influence of a spring 43, insures the driving. The spindle 44 of the disk 40, rotates in a bracket 45 which can move about the spindle 46 of an intermediate pinion 47 when a lever 48, to which the said bracket is connected by a rod 49, is acting on the said bracket. The same disk 40 is secured to a pinion 50 which engages with the pinion 47 which, in its turn, engages with a wheel 51 secured to an intermediate spindle 52 carrying pinions 53 driving the large wheels 20. The lever 48 is provided at the free end with a roller 54 which is in contact with the periphery of a disk 57 provided with projections 55 56. At each passage of the said projections, the roller 54 is raised, and the lever 48 lowers the bracket 45 of the disk 40, the center of which goes away from that of the driving disk 39. The radius of the circle of contact thus gradually decreasing, the speed of the disk 40 and consequently, the speed of the machine will likewise decrease. The projections of the disk 57 being capable of having any desired amplitude, and of being arranged at any desired point of the circumference, it follows that it is possible to reduce the speed of the machine as much as necessary and at the exact moment required by the formation of the knots of the net, and then to return the normal speed in a gradual manner and without shocks, as required by the nature of the work.

It is to be understood that the details of the herein described net-making machine may be varied without departing from my invention.

What I claim as my invention and desire to secure by Letters Patent is—

1. In a net-making machine, the combination with a main frame, levers oscillating thereon and means for operating the same, of means to knot together threads to form a net comprising a hook-bar carried by the oscillating levers and movable in every direction, and hooks mounted on the hook-bar, means for moving said hook-bar, cams and bevel gearing adapted to follow the movements of the oscillating levers and to impart transverse movement to the bar and the hooks thereon independently of the other motions of the machine, and means comprising a friction plate for controlling and changing the speed of the cams and bevel gearing whereby the movements of the latter may be effected at variable and determined periods according to the arrangement of the knots to be produced.

2. In a net-making machine, the combination with a main frame, of means to knot together threads to form a net comprising a hook-bar movable in every direction and hooks mounted on the hook-bar, means for moving said hook-bar on the main frame, means for rotating the hooks, a jaw, a jaw-comb guiding the vertical threads, and means for vertically moving said jaw-comb at the moment of completion of the knots whereby the threads are maintained upon the edge of the jaw above the warp threads.

3. In a net-making machine, the combination with a main frame, of means to knot together threads to form a net comprising a hook-bar movable in every direction and hooks mounted on the hook-bar, means for moving the hook-bar in any direction, means for rotating the hooks, a flying comb coöperating with the hooks on the hook-bar in the making of the mesh, a series of pivoted teeth on the flying comb, said pivoted teeth being adapted to move apart to distances which increases progressively toward the end of the comb, means for tying meshes, and means comprising a rod, a spring and a lever for operating said pivoted teeth for the purpose specified.

4. In a net-making machine the combination of a main frame, a hook-bar mounted on said main frame said hook-bar being movable in any direction relatively to the frame, means for moving said hook-bar in any direction, a series of hooks rotatably mounted on the hook-bar, means for rotating the hooks, a flying comb coöperating with the hooks of the hook-bar in the making of the mesh, a series of movable teeth on the flying comb said movable teeth being adapted to move apart the threads engaged by them said movement being effected at the moment when the hooks engage the threads, means for causing the engagement of said threads, and means for operating said movable teeth.

In testimony whereof I have signed my name to this specification in the presence of two subscribing witnesses.

CHARLES ZANG.

Witnesses:
HANSON C. COXE,
GEORGES BONNEUIT.